Patented July 12, 1932

1,866,743

UNITED STATES PATENT OFFICE

ARTHUR BERTRAM ABBOTT, OF BRIXTON, LONDON, ENGLAND, ASSIGNOR OF ONE-HALF TO ROBERT ABBOTT, OF LONDON, ENGLAND

COATING COMPOSITION

No Drawing. Application filed December 19, 1929, Serial No. 415,370, and in Great Britain January 19, 1929.

This invention relates to the determination, or measurement, of the presence, or quantity, of water in oil tanks and the like.

It is well known that when oil is stored in a tank or reservoir any water contained therein will, in time, settle to the bottom of the reservoir so that the oil is floating actually upon a layer of water. It is highly desirable not only to be able to detect readily the presence of such water, but also that the approximate or exact quantity thereof should be readily ascertainable, and the object of the present invention is to provide improved means whereby these ends may be attained.

In order to detect the presence and depth of any water in an oil tank or reservoir it has been proposed previously to employ a strip of paper or other material which is impregnated or coated with a substance which is insoluble in oil but soluble in water, or which is not acted on by oil but is changed in colour or appearance by water. In use a strip so treated is fixed in a suitable frame which will sink. The frame is lowered to the bottom of an oil tank, the contents of which are to be tested, and left in this position for some time. When the frame and treated strip are withdrawn, the substance with which the strip is coated or impregnated will have been dissolved off for a distance corresponding with the depth of any water of the bottom of the tank. A paper strip coated with syrupy aqueous solution of citrate of iron and ammonia is an example of a treated strip suitable for such use.

According to the present invention, however, in order to detect the presence, or to determine the quantity of water in an oil tank or the like, there is applied to a dip-rod or the like a coating or layer of a mixture or composition, preferably in paste or liquid form, having at least two ingredients of which the one is impervious to, or unaffected, by oil but soluble in water and the other of which is absorbent to water. The coated dip-rod is then lowered into the oil tank until its lower end touches the bottom of the latter and subsequently the dip-rod is withdrawn and inspected.

When the mixture or composition on the dip-rod or the like comes into contact with oil it is unaffected thereby but where it contacts with water the absorption of water by the absorbent ingredient brings about the dissolving of the oil-impervious, water-soluble ingredient in the water, so that, as a result of the procedure outlined in the preceding paragraph, the appearance of the treated dip-rod or the like at that portion thereof which has been immersed in any water will be different from that portion thereof which has been immersed in oil only.

Owing to the presence of the water absorbent ingredients, the time taken to effect the necessary change in appearance at that portion of the dip-rod which is immersed in water is rendered very considerably shorter than would be the case were no such ingredients employed.

Preferably, in accordance with the invention, the mixture or composition contains, in addition to the above-mentioned ingredients, what may be termed a binding agent provided especially to obviate undue contamination of the contents of the tank or the like which is tested for water.

If desired, the mixture or composition may contain an ingredient which acts as a preservative to prevent too ready access of moisture, that of the atmosphere for example, to the water-absorbent ingredient.

Further, the mixture or composition may contain any desired colouring and/or filling agents.

A sugary substance such as treacle, heavy syrup, molasses or honey may be employed as an oil-impervious, water-soluble ingredient which may be mixed with a water-absorbent ingredient such as chalk, charcoal or the like in granular or powdered form, preferably in substantially equal proportions by weight to form a paste or liquid.

A very finely divided powder such as jeweller's rouge (which is unaffected by water) may be employed as a binding agent, whilst a spirit such as turpentine may be employed as a preservative to prevent deterioration of the mixture or composition.

For a colouring agent a solution in water of sulphurated potash (British Pharmacopœia) and tincture of ferric chloride (British Pharmacopœia) may be employed in the proportions, preferably, of two parts by weight to one, respectively.

A testing mixture or composition according to one preferred form of the invention comprises the following ingredients in the following proportions by weight:—

| | | | |
|---|---|---|---|
| A. Oil-resisting, water soluble ingredient. | Treacle | 32 | parts |
| B. Water absorbent ingredient | Chalk (in granular form) | 32 | parts |
| C. Binding ingredient | Jeweller's rouge | 2 | parts |
| D. Preserving ingredient | Turpentine | 0.166 | parts |
| E. Colouring ingredients | Sulphurated potash (British Pharmacopœia) solution (10% in water) | 0.166 | parts |
| | Tincture of ferric chloride (British Pharmacopœia) | 0.083 | parts |

In the preparation of this particular mixture or composition, the chalk and rouge are added to the treacle and the whole is stirred thoroughly until a stiff paste is produced, the sulphurated potash solution and the tincture of ferric chloride are next added and stirred well into the stiff paste, then the turpentine is added and the resultant mixture again stirred to mix all the ingredients thoroughly together and the resulting paste is stored in an airtight container for twenty four hours at least when it is ready for use at will.

In use, a thin even coating of this mixture is applied to a dip-rod, which is then lowered vertically into an oil tank, in which the presence of water is suspected, until the lower end of the rod rests upon the bottom of the tank. The rod is left in this position for a period depending upon the nature, i. e. viscosity or density, of the oil, being about five seconds for a thin oil such as motor spirit and above five minutes in the case of heavy fuel oils. When the dip-rod is removed, it will be found that only at that part thereof which has been immersed in water, the composition is lighter in colour than the remainder thereof, owing to the dissolving of the treacle in the water. In the case of a heavy or dark coloured oil, the oil adhering to the rod after withdrawal from the tank is removed by means of a rubber scraper when it will be found that the composition has been removed only at that part of the rod which was immersed in the water. In all cases there will be a clearly defined line of demarkation on the dip-rod at the part thereof which when in the tank was at the level of the water therein. Hence such a test may serve not only to ascertain the presence of water but also to ascertain the quantity of water present in the tank.

What I claim is:—

1. A composition of matter comprising, in combination, 32 parts by weight of treacle; 32 parts by weight of chalk in granular form; 2 parts by weight of rouge; 0.166 parts by weight of turpentine; 0.166 parts by weight of a 10% aqueous solution of sulphurated potash; and 0.083 parts by weight of tincture of ferric chloride.

2. A composition of matter comprising, in combination, 32 parts by weight of treacle; 32 parts by weight of chalk in granular form; 2 parts by weight of rouge, and 0.166 parts by weight of turpentine.

3. A composition of matter comprising, in combination, 32 parts by weight of treacle; 32 parts by weight of chalk in granular form; and about two parts by weight of rouge as a binding agent, together with a preservative in 5 minute quantity but sufficient to prevent deterioration of the composition.

In witness whereof I have hereunto signed my name.

ARTHUR BERTRAM ABBOTT.